United States Patent [19]

Milberger

[11] Patent Number: 4,593,944
[45] Date of Patent: Jun. 10, 1986

[54] PILE DRIVING CONNECTOR

[75] Inventor: Lionel J. Milberger, Houston, Tex.

[73] Assignee: Vetco Offshore, Inc., Ventura, Calif.

[21] Appl. No.: 573,197

[22] Filed: Jan. 23, 1984

[51] Int. Cl.[4] .............................................. F16L 37/10
[52] U.S. Cl. .................................. 285/321; 285/403; 285/921
[58] Field of Search ............... 285/321, 340, 403, 404, 285/DIG. 22; 403/326; 405/251; 166/339, 338, 344, 345; 175/320

[56] References Cited

U.S. PATENT DOCUMENTS

| | | | |
|---|---|---|---|
| 1,581,973 | 4/1926 | Meyer | 285/404 X |
| 3,116,945 | 1/1964 | Blomquist et al. | 285/340 X |
| 3,134,615 | 5/1964 | Cator | 285/404 X |
| 3,273,915 | 9/1966 | Bishop et al. | 166/338 X |
| 3,545,794 | 12/1970 | Wise et al. | 285/340 X |
| 3,585,803 | 6/1971 | Bardgette | 285/321 X |
| 3,606,393 | 9/1971 | Huntsinger et al. | 285/321 X |
| 3,768,842 | 10/1973 | Ahlstone | 285/321 X |
| 3,781,042 | 12/1973 | Estlick | 285/404 X |
| 4,105,226 | 8/1978 | Frey et al. | 285/321 X |
| 4,111,464 | 9/1978 | Asano et al. | 285/321 X |
| 4,124,233 | 11/1978 | Ahlstone | 285/321 X |
| 4,296,953 | 10/1981 | Nagao et al. | 285/403 X |

FOREIGN PATENT DOCUMENTS 1520150 8/1978 United Kingdom ............... 285/340

Primary Examiner—Thomas F. Callaghan

[57] ABSTRACT

A pile driving connector device comprising a tubular pin member for telescopic connection with a corresponding box member with the pin member having a wall with a locking groove in the outer face thereof adapted for operational engagement with a locking ring and a bearing surface adapted for driving engagement with the bearing shoulder of a corresponding box member, a tubular box member having a bore for receiving the pin member, a counterbore configured to be adjacent to the locking groove of the pin member and a bearing shoulder adapted for driving engagement with the bearing surface of the pin member, and a conically shaped locking ring coaxially mounted within the counterbore of the box member having a base portion detachably connected to the box member and a upper portion adapted for engagement with a side surface of the locking groove upon insertion of the pin member into the box member for interlocking connection of the pin and box members.

17 Claims, 4 Drawing Figures

PILE DRIVING CONNECTOR

BACKGROUND OF THE INVENTION

This invention relates to a pipe connector and more particularly to a connector device for joining adjacent sections of tubular piling assemblies without requiring rotation therebetween.

In the production of oil and gas from offshore wells, it is often necessary to locate the drilling and production platforms of wharfs at an offshore site. These platforms are anchored to the sea floor by tubular piles. The length of each of the piles may exceed a thousand feet. The handling of such large tubular piles is facilitated by building up the piles from 100–150 foot sections joined together in an end-to-end manner utilizing pile connectors to interconnect two adjacent sections.

Several types of pile connector have previously been utilized including interrupted screw thread connectors, snap-type locking ring connectors, and engagable dog-type connector. Each type of prior pile connector has one or more undesirable inherent characteristics or limitations.

In the interrupted screw thread type connector, the foremost shortcoming is that adjacent pipe sections must be relatively rotated to establish a connection therebetween and such rotation requires application of a large amount of torque. Necessarily, large equipment must be utilized to accomplish this rotation which is an inconvenience in an offshore environment. Additionally, the screw thread connector is expensive to manufacture, requires excessive care and handling to prevent damaging the threads, and requires precise alignment during connection.

The prior snap-type locking ring connectors have experienced failures because improper loading of the locking ring results in a high stress concentration in the machined receptacle which receives the locking ring. The locking ring also has a tendency to move to an unlocked position as a result of the vibrations encountered as the pile sections are driven into the sea floor.

The dog-type connectors which have previously been available utilize radially engagable dogs to secure one section of piling to the next section. In these prior dog-type connectors the connection is preloaded to secure the piling sections together. However, the vibrations which develop during offshore driving of piles may cause the connector to vibrate loose thereby relieving its preload. Thus, vibration can cause the radially moveable threaded screws, which are used in these connectors, to seize and gall thereby preventing the screws from being rotated after the driving operation. Also, the dogs tend to become brittle and are subject to bending or breaking because of small imperfections machined in the connectors used with the dogs. Further, because such dogs must be moved in a radial direction to disengage one section of the piling from another, an excessive amount of space must be provided for them in the connectors.

In a pile driving connector, it is desirable to attain fast, easy connector make up without requiring the application of torque i.e., without relative rotation of the piling sections. It is also desirable that the connector maintain preloading, i.e., the continuous urging together of the abutting ends of adjacent tubular pile sections should be insured. Moreover, the connector should be mechanically uncomplicated, economical to manufacture, and capable of withstanding bending, axial tension, and axial compressive stresses experienced during driving.

Accordingly, it is an object of the present invention to provide an improved pile driving connector which achieves fast, easy make up without the need for relative rotation between the pile sections.

Another object of the invention is to provide a snap-type pile driving connector that maintains preload between abutting pipe ends.

A further object of the invention is to provide a non-rotating pile driving connector having rigid structural integrity for withstanding bending, axial tension, and axial compressive stresses during driving.

A still further object of the invention is to provide a pile driving connector which is economical to manufacture and efficient in use.

SUMMARY OF THE INVENTION

It has been found that the foregoing and related objects and advantages can be obtained in a pile driving connector device which includes a tubular pin member for telescopic connection with a cooperating box member. The pin member has a wall with a locking groove in the outer face thereof, the locking groove being adapted for operational engagement with a locking ring. The pin member also has a bearing surface adapted for driving engagement with the bearing shoulder of the cooperating box member. The tubular box member has a bore for receiving the pin member, a counterbore configured to be adjacent to the locking groove of the pin member upon connection of the pin and box members, and a bearing shoulder adapted for driving engagement with the bearing surface of the pin member. A locking ring is mounted, by means of an adjustable collar, within the counterbore of the box member and has a base portion detachably connected to the box member via the collar. The locking ring further has an upper portion adapted for engagement with a side surface of the pin member locking groove upon insertion of the pin member into the box member, the ring thus establishing an interlocking connection of the pin and box members. The locking ring has a plurality of slots, extending longitudinally from the base portion and disposed about the locking ring, which define a plurality of spaced-apart stud elements with the upper surface of the stud elements engaging the side surface of the locking groove.

DESCRIPTION OF THE PREFERRED EMBODIMENT

Figures 1, 2:
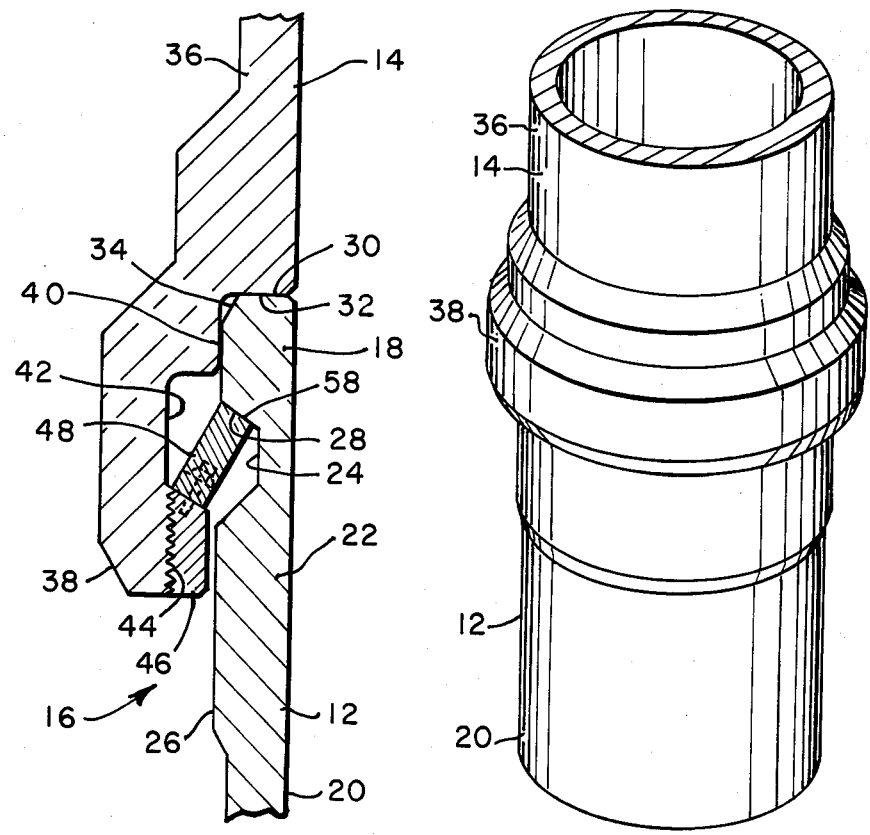
FIG. 1 is a perspective side elevational view, partly in section, of the pin member and box member of a pipe connector device in accordance with the present invention.
FIG. 2 is a partial longitudinal sectional view of the connector device of FIG. 1 in a made-up condition.

The pile connector device of the present invention is generally designated by the numeral 16 and comprises a pin member 12, a box member 14, and a locking ring 48.

Referring to the drawing, the pin member 12 is generally of tubular configuration having an upper end 18, adapted for telescopic insertion into the box member 14, and a lower end 20 for permanent connection to a tubular piling section by welding or the like. The wall 22 of pin member 12 is provided with a locking groove 24 in its outer face 26. The locking groove 24 is, at its upper end, defined by a flat side surface 28 adapted for engagement with the locking ring 48. Surface 28 faces generally downwardly. The bottom of groove 24 is, in the disclosed embodiment, parallel to the axis of pin member 12 and surface 28 extends outwardly at an obtuse angle from the bottom of the groove.

The upper end 18 of the pin member 12 has a bearing surface 30 for driving engagement with a bearing shoulder 32 of the box member 14. A beveled outer edge 34 is provided on the bearing surface 30 to facilitate alignment and subsequent insertion of the pin member 12 into the box member 14.

The box member 14 is also generally of tubular configuration with an upper end 36, for permanent connection to a tubular pile section by welding or the like, and a lower end 38 which defines a receiver for the pin member 12. The box member 14 has a bore 40 which is complementary in size and shape to the exterior of upper end 18 of the pin member 12. Box member 14 also has a counterbore portion 42 configured to be disposed adjacent the locking groove 24 upon insertion of the pin member 12 into box member 14. The lower end 44 of the counterbore 42 is internally threaded so as to permit engagement by an externally threaded internal collar 46.

The locking ring assembly comprises the locking or tilt ring 48 which is detachably mounted by threaded fasteners 50 or the like to the internal collar 46. The locking ring 48 defines a generally frustoconically shaped member and includes a base portion 52 and a plurality of teeth or stud elements 56 which are defined by slots 54. Each stud element 56 has a flat upper surface 58 cut at an angle which, in the manner to be described below, will be forced into abutting engagement with the side surface 28 of the locking groove 24. A plurality of fastener apertures 60 are provided in the base portion 52, at the bottoms of slots 54, to facilitate connection of ring 48 to collar 46, the collar having tapped holes for receiving fasteners 50.

Referring to FIG. 2, the pin member 12 and box member 14 are shown in a made-up interlocking connection with the upper surfaces 58 of the stud elements 56 engaging the side surface 28 of the locking groove 24. It is understood that although only one stud element 56 is shown in FIG. 2, the upper surface of each stud element around the periphery of the locking ring 48 engages the flat annular side surface 28 of the pin member 12.

Figures 3, 4:
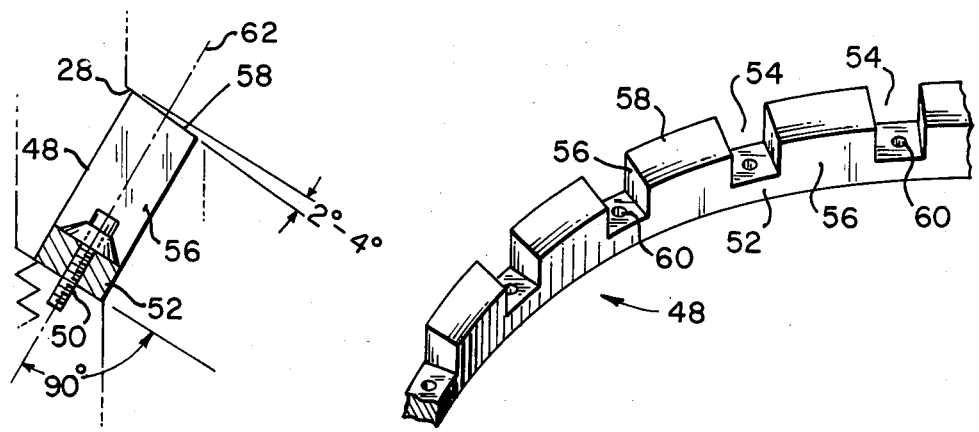
FIG. 3 is an enlarged partial perspective view of the locking ring of the connector device of FIGS. 1 and 2.
FIG. 4 is an enlarged cross-sectional diagrammatic view, taken in the direction of FIG. 2, of a portion of the locking ring, FIG. 4 showing the engagement of the locking ring with the pin member.

Referring to FIG. 4, the above-described beveling of side surface 28 of the locking groove 24 may clearly be seen. The upper surface 58 of the stud element 56 is also beveled to abut the side surface 28. In the illustrated embodiment, the amount of incline of the beveled upper surface 58 is preferably within the range of 2°–4° relative to a line transverse to the longitudinal axis 62 of the stud elements 56. When the pin member is "snapped" into the box member the surfaces 28 and 58 will be forced, because of the configuration and positioning of ring 48, into surface-to-surface contact, i.e., the ring 48 will be distorted whereupon the stud elements 56 will be in a stressed condition and will exert a force. Accordingly, the preload of the driving connection between surfaces 30 and 32 respectively of the pin member 12 and the box member 14 resulting from the initial positioning of ring 48 is maintained and the shear loading and the possibility of rotational movement of the locking ring 48 are reduced. The angle of 2°–4° is selected because it is typically below the friction angle for steel against steel and therefore becomes a self-locking taper in the connector of the present invention.

In use, the locking ring is mounted on collar 46 and positioned within the counterbore 42 of the box member 14. The pin member 12 is driven into the box member 14 to attain the interlocking connection of pin member 12 and box member 14. Upon impact, the locking ring 48 will flex and then, as axial motion continues, will snap into the locking groove 24 such that the stud elements engage the side surface 28 of locking groove 24 to interlock the connector together. The bearing shoulder 32 of the box member 14 will abut the bearing surface 30 of the pin member 12 while the now distorted, i.e., loaded, locking ring 48 maintains a degree of preload and allows an efficient transfer of driving force through the connector.

According, the present invention provides a snap-together mechanical driving connector that maintains preloading of the joined parts. This connector is capable of withstanding the bending, axial tension, and axial compressive stresses which may be experienced during a pile driving operation. Neither torque nor rotation of the pin and box member are required for make up. As will be apparent to persons skilled in the art, various modifications and adaptations of the structure above-described will become readily apparent without departure from the spirit and scope of the invention, the scope of which is defined in the appended claims.

I claim:

1. A pile driving connector comprising:
   a tubular pin member for telescopic connection with a cooperating box member, said pin member having an inner diameter and defining an axis, said pin member having a wall with an annular locking groove in the outer face thereof, said locking groove having a bottom which is generally parallel to said axis and a first flat side surface extending outwardly therefrom at an angle of greater than 90° whereby said groove is narrower at said bottom than at said outer face, said groove being configured for operational engagement with locking ring means, said pin member further having a generally flat annular bearing surface at an end thereof for driving engagement with a bearing shoulder of a cooperating box member;
   a tubular box member, said box member having an inner diameter which is substantially equal to said pin member inner diameter and an axis and including:
      a bore communicating with said inner diameter at a first end of said box member and comprising a box member section of increased inner diameter for coaxially receiving said pin member;
      a counterbore configured to be at least in part adjacent to and facing said locking groove of said pin member upon seating of said pin member in said box member, said counterbore comprising a portion of said bore extending from said box member first end and having an enlarged diameter; and a bearing shoulder defining the end of said bore, said bearing shoulder being configured for driving engagement with said bearing surface of said pin member, contact between said bearing shoulder and said pin member bearing surface defining the seated position of said pin member in said box member;

locking ring means mounted within said counterbore of said box member coaxially with said pin member and box member, said locking ring means having a base portion and a segmented upper coupling portion, said segmented upper portion being defined by a plurality of slots extending longitudinally toward said base portion, said slots being disposed about said locking ring means so as to form a plurality of spaced-apart stud elements, said stud elements extending from said base portion and having generally flat end surfaces for engagement wtih said first said side surface of said locking groove, said stud elements each having a longitudinal axis, and said end surfaces thereof being inclined at an angle relative to a plane transverse to their respective axes said locking ring means establishing a tapered interlocking connection between said pin and box members and providing a force which urges said bearing surface of said pin member against said bearing shoulder of said box member; and means for detachably affixing said locking ring means base portion to said box member within said counterbore at a location radially and axially displaced with respect to said pin member locking groove first surface, said affixing means mounting said locking ring means such that said stud element end surfaces are in contact with said pin member locking groove first side surface, and said stud element axes are oriented generally transversely with respect to said locking groove first side surface when said locking ring means is in an unstressed condition whereby said stud element end surfaces are angularly oriented relative to said locking groove first side surface when in said unstressed condition.

2. The device of claim 1 wherein the end surface of each of said stud elements may be in surface-to-surface contact with said locking groove first side surface when said locking ring means is in a stressed condition.

3. The device of claim 2 wherein the said end surface of each stud element is inclined within a range of 2°–4° relative to the plane transverse to its respective longitudinal axis.

4. The device of claim 1 wherein:
said box member has an upper end for connection to a pile section and a lower end having said bore for receiving said pin member,
said pin member has an upper end for insertion in said box member and a lower end for connection to a pile section,
said locking groove first side surface of said groove faces downwardly and radially outwardly, and
said locking ring means is mounted within the lower end of said box member counterbore so that said stud elements extend upwardly and radially inwardly.

5. The device of claim 4 wherein said bearing surface is disposed at the upper end of said pin member and said bearing shoulder defines the upper end of said box member bore, said bearing surface abutting said bearing shoulder upon establishment of an interlocking connection of said pin and box members.

6. The device of claim 1 wherein said counterbore has a threaded portion and side box member further includes a collar havng an external thread complementary to the thread of said counterbore threaded portion, said base portion of said locking ring means being affixed to said collar by said detachable affixing means, said collar being threadably mounted within said counterbore.

7. The device of claim 6 wherein said means for detachably affixing said locking ring means base portion to said collar comprises a plurality of threaded fasteners.

8. The device of claim 1 wherein said locking ring means is dimensioned and configured to maintain said force whereby a preloaded condition between said pin member bearing surface and said box member bearing shoulder is created upon establishment of the interlocking connection between said pin and box members.

9. The device of claim 6 wherein said locking ring means is dimensioned and configured to maintain said force whereby a preloaded condition between said pin member bearing surface and said box member bearing shoulder is created upon establishment of the interlocking connection between said pin and box members.

10. The device of claim 9 wherein surface-to-surface contact between said stud element end surfaces and said locking groove first side surface may be established.

11. The device of claim 10 wherein the said end surface of each stud element is inclined within a range of 2°–4° relative to the plane transverse to its respective longitudinal axis.

12. The device of claim 9 wherein:
said box member has an upper end for connection to a pile section and a lower end having said bore for receiving said pin member,
said pin member has an upper end for insertion in said box member and a lower end for connection to a pile section,
said locking groove first side surface of said groove faces downwardly and radially outwardly, and
said locking ring means is mounted within the lower end of said box member counterbore so that said stud elements extend upwardly and radially inwardly.

13. The device of claim 12 wherein said bearing surface is disposed at the upper end of said pin member and said bearing shoulder is defined by the upper end of said box member bore, said bearing surface abutting said bearing shoulder upon establishment of an interlocking connection of said pin and box members.

14. The device of claim 13 wherein surface-to-surface contact may be established between said stud element end surface and said locking groove first side surface.

15. The device of claim 14 wherein the said end surface of each said stud element is inclined within a range of 2°–4° relative to the plane transverse to its respective longitudinal axis.

16. The device of claim 15 wherein said means for detachably affixing said locking ring means base portion to said collar comprises a plurality of threaded fasteners.

17. The device of claim 1 wherein said means for detachably affixing said locking ring means base portion to said box member comprises a plurality of threaded fasteners.

* * * * *